United States Patent [19]

Sindeband et al.

[11] Patent Number: 5,009,277
[45] Date of Patent: Apr. 23, 1991

[54] METHOD AND APPARATUS FOR POSITION DETERMINATION

[75] Inventors: Seymour J. Sindeband, Pound Ridge, N.Y.; Robert Butler, Milford, Conn.

[73] Assignee: Science Accessories Corp., Stratford, Conn.

[21] Appl. No.: 495,330

[22] Filed: Mar. 19, 1990

[51] Int. Cl.⁵ .............................................. G08C 21/00
[52] U.S. Cl. ......................................... 178/18; 367/907
[58] Field of Search .................... 178/18, 19; 367/127, 367/907

[56] References Cited

U.S. PATENT DOCUMENTS

| | | |
|---|---|---|
| 3,626,483 | 12/1971 | Whetstone et al. .................. 181/0.5 |
| 3,647,962 | 3/1972 | Whetstone ......................... 178/17 C |
| 3,838,212 | 9/1974 | Whetstone et al. .................. 179/18 |
| 4,012,588 | 3/1977 | Davis et al. ........................... 178/18 |
| 4,124,838 | 11/1978 | Kiss ..................................... 340/1 R |
| 4,317,005 | 2/1982 | de Bruyne ......................... 178/18 X |
| 4,886,943 | 12/1989 | Suzuki et al. ........................ 178/18 |
| 4,891,474 | 1/1990 | Kelly ................................... 178/18 |

Primary Examiner—Stafford D. Schreyer
Attorney, Agent, or Firm—Martin Novack

[57] ABSTRACT

A form of the disclosed invention employs data validation and screening based on the proximity of sequentially measured data points. Another form of the invention detects noisy conditions manifested in a pilot signal measurement, and discards data taken just after (and/or, if desired, just before) detection of the condition.

16 Claims, 4 Drawing Sheets

METHOD AND APPARATUS FOR POSITION DETERMINATION

BACKGROUND OF THE INVENTION

This invention relates to graphical digitizer equipment and, more particularly, to improvements in validating and screening measurements obtained from such equipment.

Graphical digitizers are conventionally used to input graphical coordinate information, or the like, to a companion system. In a graphical digitizer, wave energy is typically passed between a movable element (such as a stylus or cursor) and one or more transducers located at fixed reference locations. The transit time of the wave energy traveling (in either direction) between the movable element and the reference locations is used in determining the position of the movable element in one, two, or three dimensions, typically in terms of digital coordinates. A type of graphical digitizer manufactured and sold by the assignee hereof, Science Accessories Corporation, measures the transit time of acoustic or sonic energy propagating through air. The transit time of sound traveling from a source on the movable element to each of a plurality of microphones is used, in conjunction with the velocity of sound in air and known geometrical relationships, to compute the position of the movable element.

Graphical digitizer equipments, like most measuring equipments, are susceptible to errors caused by noise and other factors. For example, through-the-air sonic digitizers of the type described above are susceptible to extraneous acoustic noise in the environment, and also to multipath echoes of the sound energy employed by the digitizer equipment itself. Electronic interference or other intermittent phenomena can also lead to substantial digitizing errors.

Since digitizers are typically utilized to measure and store data points at a relatively high acquisition rate, and since the acquired data is often immediately used by a companion system, the occurrence of occasional inaccurate coordinate measurements, even grossly inaccurate ones, may not be recognized at all, or until they cause a problem in subsequent processing. The outputting of even occasional incorrect coordinate data can be particularly undesirable for certain applications. Further, when subsequent processing involves averaging of acquired data points, a few grossly inaccurate measurements can result in substantial errors in averaged data that would otherwise be quite acceptable.

It is among the objects of the present invention to reduce or eliminate these type of problems in graphical data digitizers and particularly, although not necessarily, in sonic graphical digitizers.

SUMMARY OF THE INVENTION

A form of the present invention employs data validation and screening based on the proximity of sequentially measured data points. Another form of the invention detects noisy conditions manifested in a pilot signal measurement, and discards data taken just after (and/or, if desired, just before) detection of the condition.

In an illustrated embodiment, the position of a moveable element is determined in two dimensions, but it will be understood that the improvements described herein have application to position determination in one, two, or three dimensions, which utilizes any desired number or configuration of transmitters and receivers.

Further features and advantages of the invention will become more readily apparent from the following detailed description when taken in conjunction with the accompanying drawings.

DESCRIPTION OF THE PREFERRED EMBODIMENT

Figure 1:
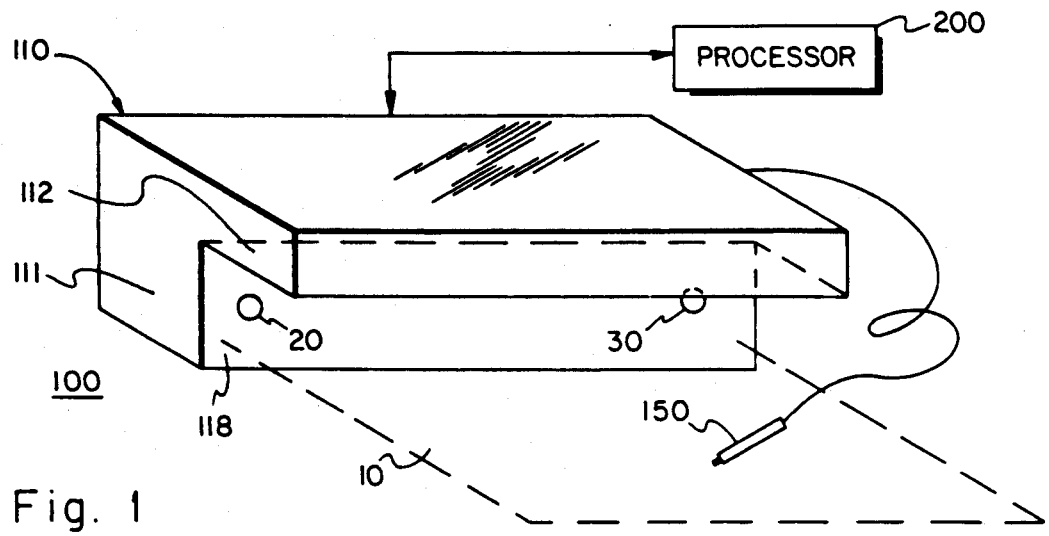
FIG. 1 is an elevational perspective view of an apparatus utilized in an embodiment of the invention.

Referring to FIG. 1, there is shown an apparatus in accordance with an embodiment of the invention for determining the position of an element movable in a region located to one side 10 of the apparatus. As initially described, the apparatus is in accordance with a digitizer apparatus disclosed in the copending U.S. patent application Ser. No. 467,632, filed Jan. 19, 1990, and assigned to the same assignee as the present application. The apparatus includes an elongated housing 110 which is positioned generally adjacent an edge of the region in which the position of a movable element 150 is to be determined. The housing 110 has a base portion 111 which contains a pair of spaced apart transducers 20 and 30 that are mounted in a surface 118 of the base that faces the region 10. The housing 110 has an upper body portion 112 which is disposed above the base portion and which protrudes, in cantilevered fashion, toward the region 10, so that the transducers 20, 30 are recessed, with respect to the region 10, beneath the cantilevered upper body portion 112 of the housing 110.

Figure 2:
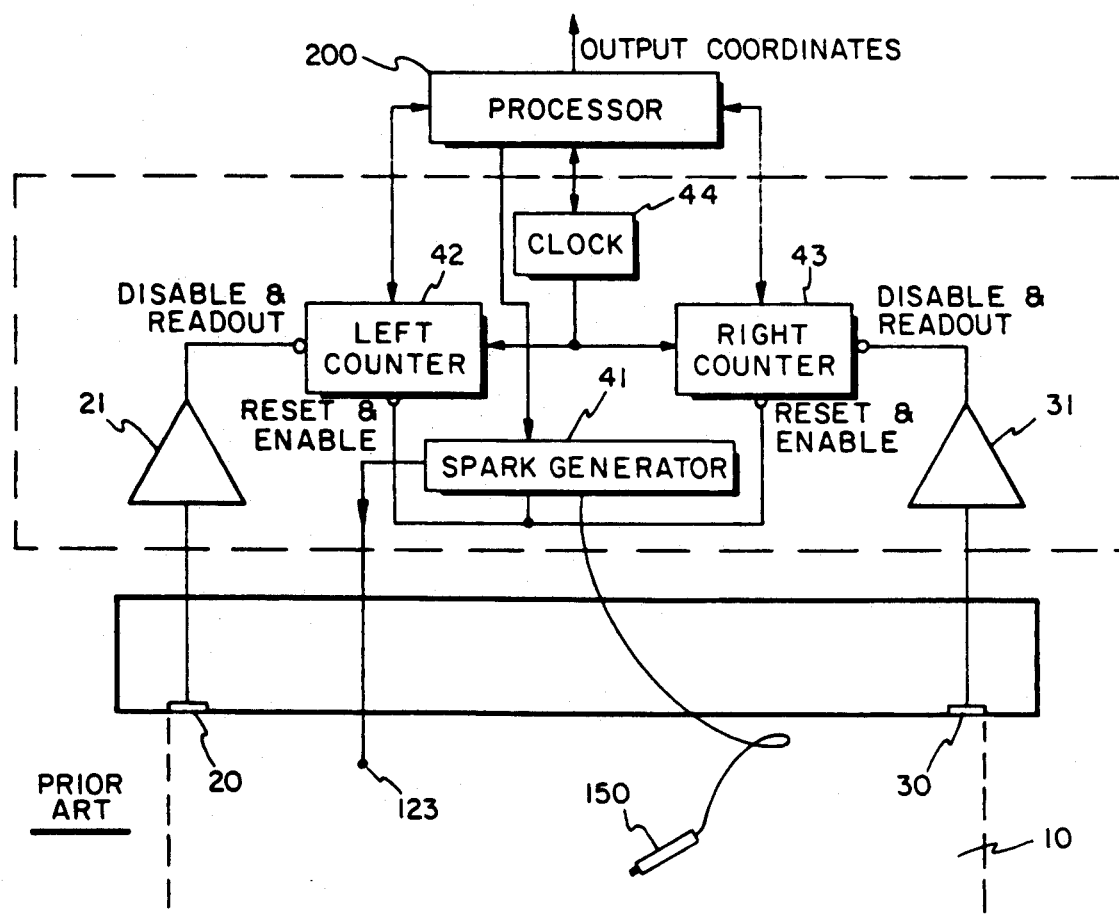
FIG. 2 is schematic diagram, partially in block form, of prior art circuitry which can be utilized in an embodiment of the invention.

In a form of the embodiment of FIG. 1, the transducers 20 and 30 are acoustic receivers, such as point microphones, and the movable element 150 is a stylus (or cursor puck, or other suitable device), which contains a transducer for producing acoustic wave energy. The movable element may be, for example, a stylus of the type shown in U.S. Pat. No. 4,891,474, and assigned to the same assignee as the present invention. Techniques for determining the position of a movable element sound emitter with respect to a pair of receivers, such as point microphones, are well known in the art, and reference can be made, for example, to U.S. Pat. No. 4,012,588, or to equipment known as Model GP-7 "GRAFBAR" manufactured and sold by Science Accessories Corporation, the assignee hereof. Briefly, however, and as illustrated in FIG. 2, the travel time duration is determined by circuitry 40, shown for convenience in dashed line to the rear of bar 90, which comprises a left counter 42, associated with the left microphone 20, a right counter 43 associated with the right microphone 30, a clock 44, and a spark generator circuit 41. Coincident with generation of the spark at movable element 150, the counters 42 and 43 are enabled by a gating signal from the spark generator circuit to begin counting pulses from clock 44. Upon initial reception of the sound wavefront, the microphones 20 and 30, which generally receive the wavefront at different times, produce output voltages which are coupled to high gain band pass amplifiers 21 and 31, respectively. The spark shock wave produces a fast rise time electrical impulse upon impinging on the microphone surface, and the band pass amplifiers allow only the fast rise time portion of the electrical pulse to pass while blocking out noise signals outside the band. To insure rapid operation, the amplifiers include threshold discriminators which provide an output pulse with a steep leading edge in response to the input thereto exceeding a predetermined level. The amplifier outputs are operative to disable the counters 42 and 43 and also to read out the respective counts which are indicative of the travel times between the sound source on the movable element and the microphones. In this regard, reference can be made to copending U.S. patent application Ser. No. 467,632, filed Jan. 19, 1990, and assigned to the same assignee as the present application. The respective distances can then be computed, in known manner, by multiplying the travel times by the velocity of sound in air. This can be implemented, for example, by computing module or processor 200, such as any suitable dedicated or general purpose processor.

Figure 3:
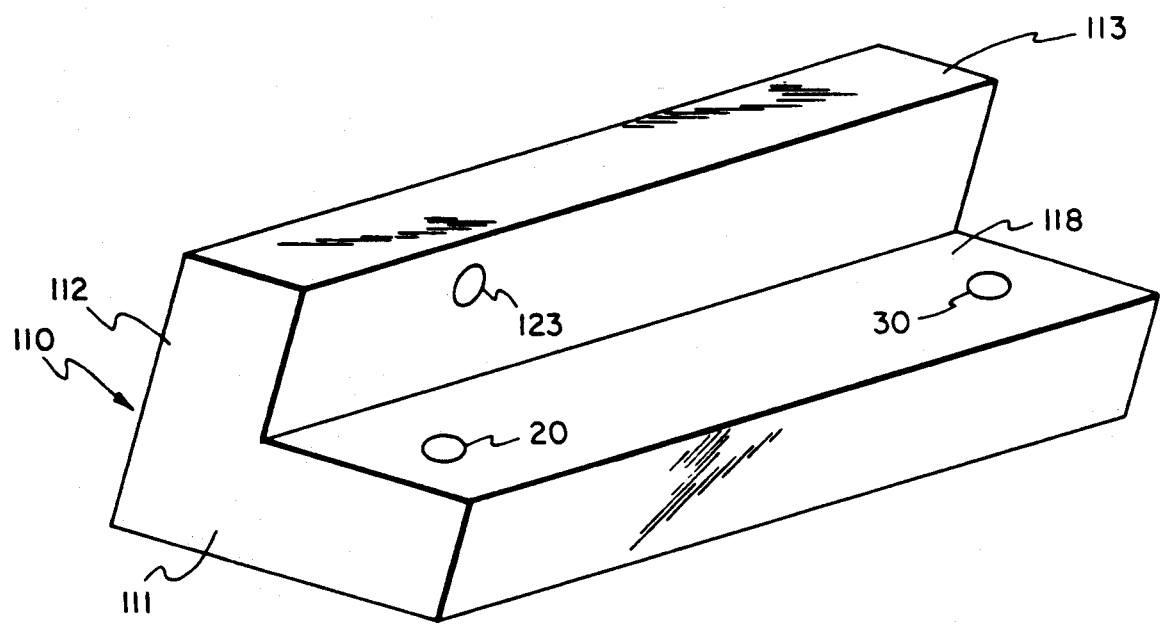
FIG. 3 is a tilted side and bottom perspective view of the FIG. 1 apparatus.
Figure 4:
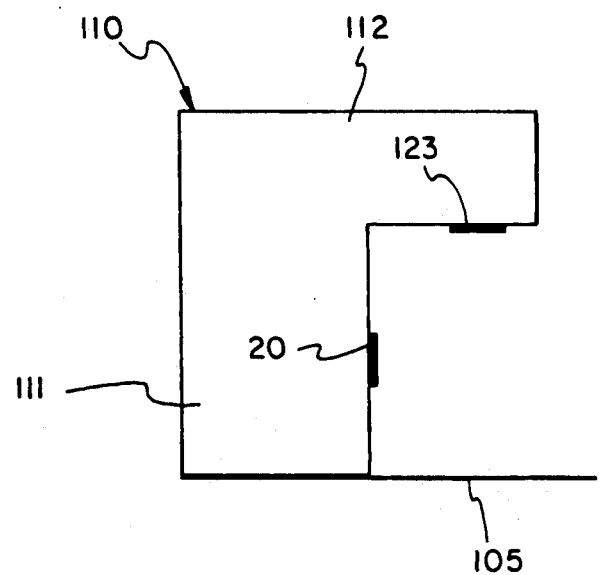
FIG. 4 is an end view of the FIG. 1 apparatus.

FIGS. 3 and 4 illustrate the use of a third fixed transducer 123 (sometimes called a "pilot transducer") mounted on the bottom wall of protruding upper body portion 112 of the housing 110 for the purpose of obtaining a velocity-representative signal (sometimes called a "pilot signal") that is used in deriving more accurate digitizer position determinations. As is known in the art, the speed of sound through air varies substantially with the temperature of the air, and acoustic digitizers can utilize a measurement between fixed distances, or "pilot measurement", to obtain temperature compensated digitizer outputs. The fixed distance can be obtained, for example, by placing the movable element at a known position before taking a pilot measurement, or by using the pilot transducer 123 as shown in FIGS. 3 and 4. In operation, as known in the art, a spark gap or other acoustic source can be provided as transducer 123. A spark generator (such as 41) can energize the spark gap 123 and clock pulses (such as from clock 44) are counted by a counter (e.g. 43 coupled to microphone 30) until the counter is disabled by arrival of the sound wavefront at microphone 30. The count represents the transit time of the sound wavefront. The speed of sound in the present air environment can then be computed by dividing the known distance (between fixed source 123 and microphone 30) by the obtained transit time. This speed of sound can then be utilized in the above-referenced distance computations for the movable element.

In the embodiment described in conjunction with FIGS. 1-4, and as in the abovereferenced copending U.S. patent application Ser. No. 467,632, the electronics 40 (e.g. FIG. 2) can be located in the housing 110. The processor 200 can also be located within the digitizer housing or can be a separately housed processor. For example, for implementing the improvements hereof, the processor 200 may comprise an IBM PS-2, together with conventional associated memory, timing, input-/output and display functions (not shown).

In the embodiment to be described, two types of digitizer data validity determinations are used together, although it will be understood that either form can be used to advantage without the other.

Figure 5A:
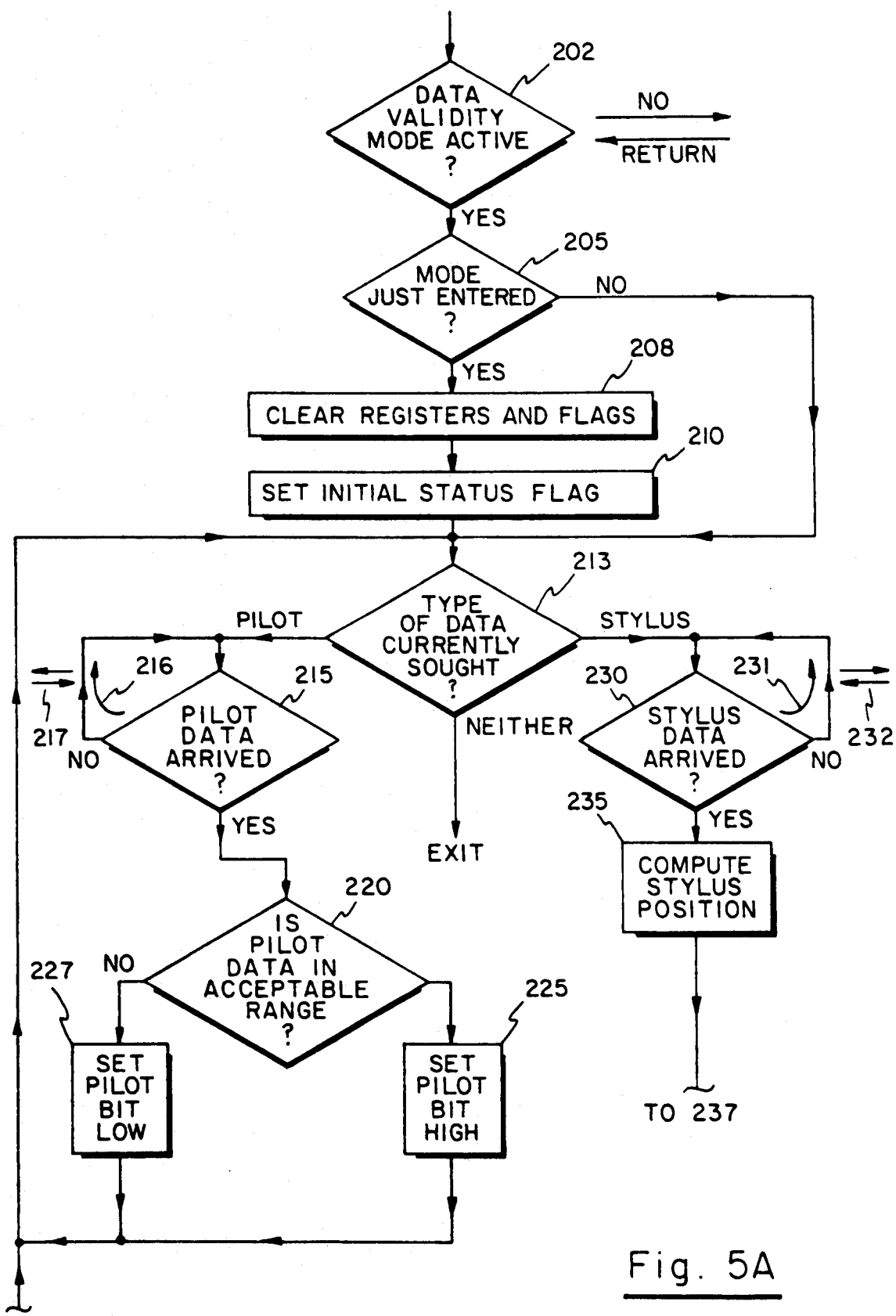
FIG. 5, which includes FIGS. 5A and 5B placed one below another, is a flow diagram of a routine for programming a processor in accordance with practicing an embodiment of the invention.
Figure 5B:
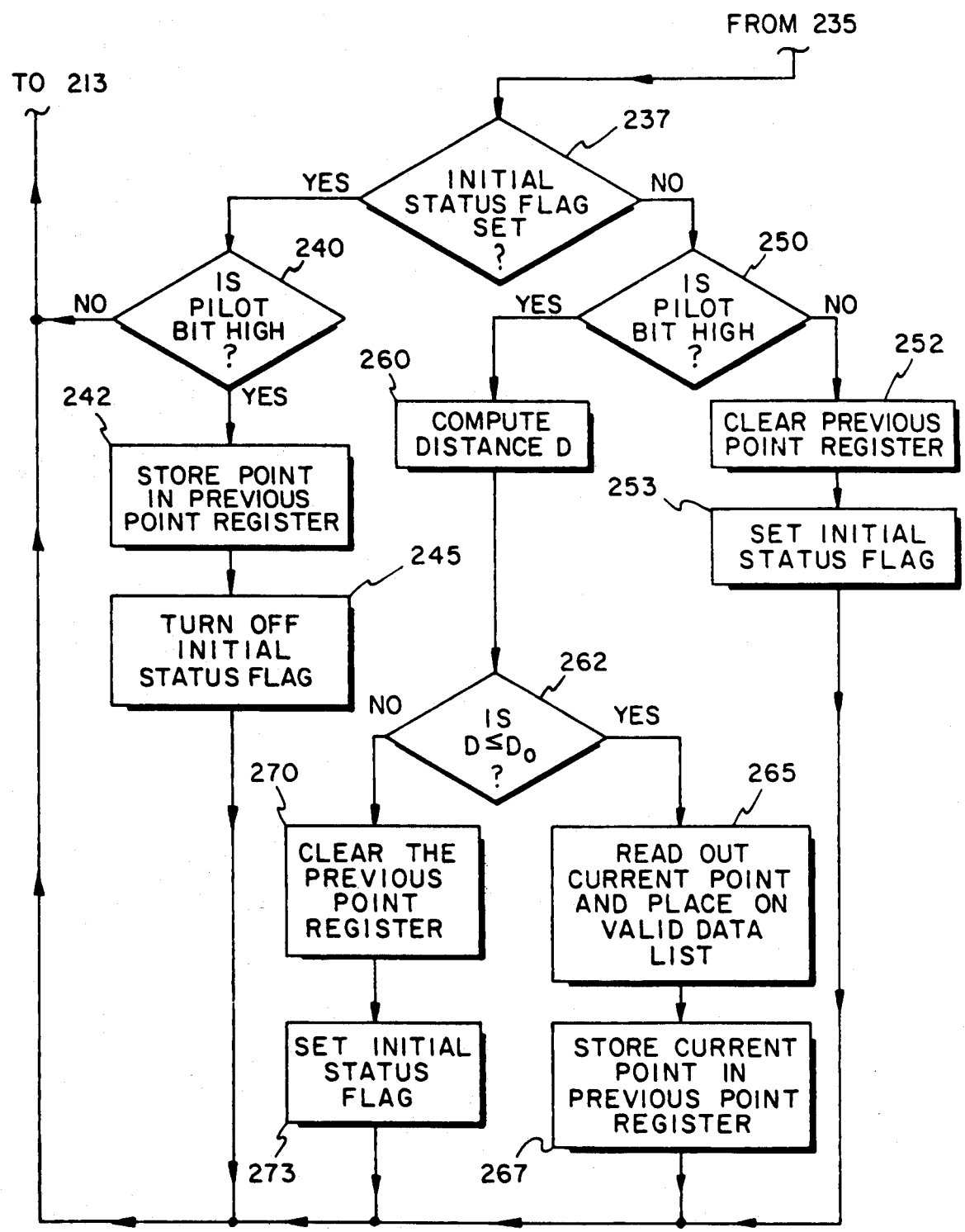

Referring to FIG. 5, there is shown a flow diagram of a routine for control of the processor 200 in accordance with an embodiment of the invention. The diamond 202 represents inquiry as to whether the data validity mode is active. If not, the routine is exited. The routine can then be re-entered, such as after a suitable interrupt resulting from an operator selection or periodic inquiry from another routine. It is assumed that the current routine will generally be implemented when a continuous data type of mode is being used at the digitizer, although it will be understood that the routine can be employed in conjunction with any data mode. The routine is illustrated as being entered via a suitable interrupt (e.g., when a continuous run mode is entered), or via operator control. If the data valid test mode is operative, inquiry is made (diamond 205) as to whether the mode was just rendered operative. If so, the block 208 is entered, this block representing the clearing of registers used for temporary storage of data points in conjunction with the data validity determinations and the clearing of any previously set flags. An initializing status flag is then set, as represented by the block 210. The decision diamond 213 is then entered (and is also entered from the "no" output branch of diamond 205), and inquiry is made as to whether the data currently being sought is pilot data or movable element data (i.e., stylus, cursor, or any movable element data). [For ease of explanation, movable element data will be referred to as stylus data for this part of the description.]In the present illustrated embodiment, it is assumed that pilot and stylus data are alternately obtained, under control of processor 200, such as by alternately energizing the stylus 150 and the pilot transducer 123 of FIG. 2. Also, in the illustrated embodiment it is assumed that no stylus data point will be deemed valid until both types of validity checks described herein, viz. validity based on the pilot data and validity based on the relative positions of adjacent stylus data, are satisfied. If pilot data is currently being sought, the data is awaited (diamond 215, loop 216, or arrows 217 if interrupted and returned during the wait) and, when the measurement data has been received the counter time of the counter used for the pilot (43 in FIG. 2) is tested (diamond 220) to determine whether it is in a predetermined acceptable range. The range of travel times may be determined, for example, from the travel time of sound over the fixed pilot distance at the lowest and highest expected operating air temperatures, for a through-the-air digitizer. If the pilot measurement is within acceptable range, a pilot acceptability indicator bit is set high (block 225), whereas if the measurement is outside the range, the pilot acceptability bit is set low (block 227). The diamond 213 is then re-entered.

If the inquiry of diamond 213 indicates that stylus measurement data is currently being sought, the data is awaited, as represented by diamond 230, loop 231, and arrows 232 which, again, indicate that interrupts can be used for performance of other functions during the wait. When the stylus measurement data arrives, the counts of counters 42 and 43 are used, in known fashion, to compute the stylus position, as represented by the block 235. Inquiry is then made (diamond 237) as to whether the initial status flag is set. If so, inquiry is made (diamond 240) as to whether the pilot acceptability bit is high. If so, the data coordinate values are stored in a previous point register (block 242), the initial status flag is turned off (block 245), and the diamond 213 is re-entered. If, however, the pilot acceptability bit is low, the computed stylus position is not stored, and the diamond 213 is re-entered directly. [Thus, in the absence of an acceptable pilot, the initial status is maintained, and no data will be read-out or stored for comparison.]

In the situation where the initial status flag is not set (the "no" branch of diamond 237), inquiry is again made (diamond 250) as to the pilot acceptability bit status. If the pilot acceptability bit is low, the previous point register is cleared (block 252), the initial status flag is set (block 253), and the diamond 213 is re-entered. [Thus, in the absence of an acceptable pilot, the initial status is re-established and no data will be read-out or stored for comparison.] If the pilot acceptability bit is high, the block 260 is entered, this block representing the computation of the distance between the current stylus data point and the previous data point stored in the previous point register. If the current point coordinates are ($x_c$, $y_c$) and the previous point coordinates are ($x_p$, $y_p$), then the computed distance will be $$D=[(x_c-x_p)^2+(y_c-y_p)^2]^{\frac{1}{2}}.$$

[For a three dimensional system, there will be a similar z term.] Inquiry is then made (diamond 262) as to whether the distance D is less than or equal to the maximum acceptable movement distance, designated $D_o$. The acceptable region around the prior point (i.e., a circle of radius $D_o$ for this embodiment) can be preselected and/or made operator adjustable, and depends on the maximum expected stylus movement in the time interval between sequentially adjacent stylus data points. If D is within acceptable range, the current point is read-out (and/or placed on a valid data list), as represented by the block 265. Also, the current data point replaces the one stored in the previous point register (block 267). If D is not within the acceptable range, the previous point register is cleared (block 270), the initial status flag is set (block 273), and diamond 213 is re-entered. Thus, after an invalid data point, the validation process starts from scratch in the present embodiment.

The structures of FIGS. 1-4 illustrated in terms of a position determining apparatus in which the movable element includes a sound source, and the transducers 20 and 30 are sound receivers. It will be understood, however, that, if desired, either or both of the transducers 20 and/or 30 can be utilized to transmit acoustic energy. In such case, the movable element can be utilized as a receiver, thereby reversing the mode of operation which was first described. As is known in the art, the transmitters can be sequentially energized, and the distance between each transmitter and the receiver in the movable element can be computed in the manner previously described. From this information, and known trigonometric relationships, the position of the movable element can be determined. In a still further variation, the movable element can be a passive reflector of acoustic energy. In this regard, see, for example, U.S. Pat. Nos. 4,012,588 or 4,124,838, assigned to the same assignee as the present application. In such case, one or both of the transducers 30, 40 could be used as a transmitter as well as a receiver. If desired, a separate transmitter can also be employed. It will also be understood that the pilot transducer 123 can be a receiver when the transducers 20 and/or 30 are transmitters. The invention is applicable to all of these situations, as well as to other types of digitizers.

The invention has been described with reference to a particular embodiment, but variations within the spirit and scope of the invention will occur to those skilled in the art. For example, in the illustrated embodiment current points are compared with previously acquired points, and either outputted or not. However, if desired, after comparison against a current point, a previously stored point can be read-out or outputted, or a combination of both techniques could be utilized. Also, it will understood that comparison of three or more points could also be utilized to localize the moveable element and determine the region of acceptability. If desired, the allowable region in which adjacent points should be located can be non-symmetrical. For example, if the direction of motion is computed from previous points, more leeway could be permitted for the next point in the general direction of motion, consistent with the physics of hand movement. Further along these lines, the velocity (rate of change of position) of motion could also be used in determining the acceptable region for an adjacent point. Also, it will be understood that while the disclosed embodiment uses a computation of distance moved based on computed coordinates, the sequentially obtained slant ranges could be directly compared, if desired. Further, it will be understood that suitable indices can be associated with received points to keep track of points which are read out and/or those which are screened out. Visual and/or audio indicators can also be generated whenever invalid data is detected.

We claim:

1. Apparatus for obtaining and outputting the position of a moveable element in a data space, comprising:
    an acoustic digitizer subsystem for determining the position of said movable element by measuring the transit time of acoustic wave energy traveling, in either direction, between said movable element and a plurality of known locations, said subsystem including a pair of transducers which are spaced a known distance apart, and means for obtaining a pilot value for the velocity of sound in air from the transit time of acoustic wave energy traveling between said pair of transducers; said subsystem being operative to produce position measurement values representative of the position of said movable element as a function said transit times and said pilot velocity value;
    means for determining whether said pilot velocity value is within a predetermined acceptable range, and for generating a pilot acceptability indication from said determination;
    means for outputting said position measurement values; and
    means responsive to said pilot acceptability indication for disabling the outputting of said position measurement values when said pilot velocity value is outside the acceptable range.

2. Apparatus as defined by claim 1, wherein said subsystem is operative to alternately obtain pilot velocity values and position measurement values.

3. Apparatus as defined by claim 1, wherein said means for disabling the outputting of said position measurement values when said pilot velocity value is outside the acceptability range is operative to continue said disabling function until an acceptable pilot velocity value is received.

4. Apparatus as defined by claim 2, wherein said means for disabling the outputting of said position measurement values when said pilot velocity value is outside the acceptability range is operative to continue said disabling function until an acceptable pilot velocity value is received.

5. Apparatus for obtaining and outputting the position of a moveable element in a data space, comprising:
   an acoustic digitizer subsystem for determining the position of said movable element by measuring the transit time of acoustic wave energy traveling, in either direction, between said movable element and a plurality of known locations;
   means for outputting said position measurement values;
   means for computing the distance between determined time sequential positions of the movable element; and
   means for disabling the outputting of said position measurement values when said computed distance is outside a predetermined range.

6. Apparatus as defined by claim 1, further comprising:
   means for computing the distance between determined time sequential positions of the moveable element; and
   means for disabling the outputting of said position measurement values when said computed distance is outside a predetermined range.

7. Apparatus as defined by claim 2, further comprising:
   means for computing the distance between determined time sequential positions of the moveable element; and
   means for disabling the outputting of said position measurement values when said computed distance is outside a predetermined range.

8. Apparatus as defined by claim 6, wherein said means for disabling the outputting of said position measurement values when said pilot velocity value is outside the acceptability range is operative to continue said disabling function until an acceptable pilot velocity value is received.

9. Apparatus as defined by claim 7, wherein said means for disabling the outputting of said position measurement values when said pilot velocity value is outside the acceptability range is operative to continue said disabling function until an acceptable pilot velocity value is received.

10. Apparatus as defined by claim 1, wherein said acoustic digitizer subsystem includes an acoustic source on said movable element and acoustic receivers at said known locations.

11. Apparatus as defined by claim 5, wherein said acoustic digitizer subsystem includes an acoustic source on said movable element and acoustic receivers at said known locations.

12. For use in conjunction with an acoustic digitizer subsystem for determining the position of a movable element in a data space by measuring the transit time of acoustic wave energy traveling, in either direction, between said movable element and a plurality of known locations, said subsystem including a pair of transducers which are spaced a known distance apart, and means for obtaining a pilot value for the velocity of sound in air from the transit time of acoustic wave energy traveling between said pair of transducers; said subsystem being operative to produce position measurement values representative of the position of said movable element as a function said transit times and said pilot velocity value; a method for improving operation of said subsystem, comprising the steps of:
   determining whether said pilot velocity value is within a predetermined acceptable range, and generating a
   pilot acceptability indication from said determination;
   outputting said position measurement values; and
   disabling, in response to the pilot acceptability indication, the outputting of said position measurement values when said pilot velocity value is outside the acceptable range.

13. The method as defined by claim 12, wherein said disabling of the outputting of said position measurement values when said pilot velocity value is outside the acceptability range continues until an acceptable pilot velocity value is received.

14. The method as defined by claim 12, further comprising the steps of:
   computing the distance between determined time sequential positions of the moveable element; and
   disabling the outputting of said position measurement values when said computed distance is outside a predetermined range.

15. The method as defined by claim 13, further comprising the steps of:
   computing the distance between determined time sequential positions of the moveable element; and
   disabling the outputting of said position measurement values when said computed distance is outside a predetermined range.

16. For use in conjunction with an acoustic digitizer subsystem for determining the position of a movable element by measuring the transit time of acoustic wave energy traveling, in either direction, between said movable element and a plurality of known locations; a method for improving operation of said subsystem, comprising the steps of:
   outputting said position measurement values;
   computing the distance between determined time sequential positions of the moveable element; and
   disabling the outputting of said position measurement values when said computed distance is outside a predetermined range.

* * * * *